US011062472B1

(12) United States Patent
Swope et al.

(10) Patent No.: US 11,062,472 B1
(45) Date of Patent: Jul. 13, 2021

(54) TRANSPORTER SEGMENTATION FOR DATA CAPTURE SYSTEM

(71) Applicant: ZEBRA TECHNOLOGIES CORPORATION, Lincolnshire, IL (US)

(72) Inventors: Charles Burton Swope, Coral Springs, FL (US); Stanko Jelavic, Davie, FL (US); Bassam S. Arshad, Wheeling, IL (US); Paul Seiter, Port Jefferson Station, NY (US); Chinmay Nanda, Port Jefferson Station, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 16/821,504

(22) Filed: Mar. 17, 2020

(51) Int. Cl.
    *G06T 7/62* (2017.01)
    *G06T 7/00* (2017.01)
    *G06Q 10/08* (2012.01)
    *G06T 7/80* (2017.01)

(52) U.S. Cl.
    CPC ............. *G06T 7/62* (2017.01); *G06Q 10/083* (2013.01); *G06T 7/0004* (2013.01); *G06T 7/80* (2017.01); *G06T 2207/10028* (2013.01); *G06T 2210/12* (2013.01)

(58) Field of Classification Search
    CPC ........... G06T 7/62; G06T 7/80; G06T 7/0004; G06T 2207/10028; G06T 2210/12; G06Q 10/083
    See application file for complete search history.

(56) References Cited

U.S. PATENT DOCUMENTS

| 2016/0076873 A1* | 3/2016 | Pangrazio | G01B 11/0608 250/208.1 |
| 2017/0227645 A1* | 8/2017 | Swope | G01S 17/42 |
| 2017/0280125 A1* | 9/2017 | Brown | G06T 5/50 |

* cited by examiner

*Primary Examiner* — Jamie J Atala
*Assistant Examiner* — Hesham K Abouzahra
(74) *Attorney, Agent, or Firm* — Yuri Astvatsaturov

(57) ABSTRACT

A server includes: a memory storing calibration data; and a processor connected with the memory, the processor configured to: obtain a point cloud depicting a capture volume containing a transporter having a body and a holder carrying an object to be dimensioned; obtain a set of positions associated with the transporter; based on the set of positions and the calibration data: generate side cutting planes corresponding to sides of the body of the transporter; generate a front cutting plane corresponding to a forward surface of a mast of the holder; and discard points between the side cutting planes and the front cutting plane to obtain a first portion of the point cloud; based on the calibration data, select a second portion of the point cloud from the first portion, excluding a base of the holder; and dimension the object based on the second portion of the point cloud.

16 Claims, 14 Drawing Sheets

TRANSPORTER SEGMENTATION FOR DATA CAPTURE SYSTEM

BACKGROUND

The transportation and storage of objects such as packages may require knowledge of the dimensions of a package. Such information may be employed to optimize the use of available space in a container (e.g. a trailer), to determine a shipping or storage cost for the package, or the like. Package dimensions, however, may not be known in advance, and workers may therefore be required to obtain package dimensions by manually measuring the packages. Taking manual measurements can be time-consuming and error-prone. Systems for automatically measuring package dimensions may also suffer from reduced accuracy, for example, when measuring packages in motion, packages with dark (e.g. black) surfaces, and the like.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
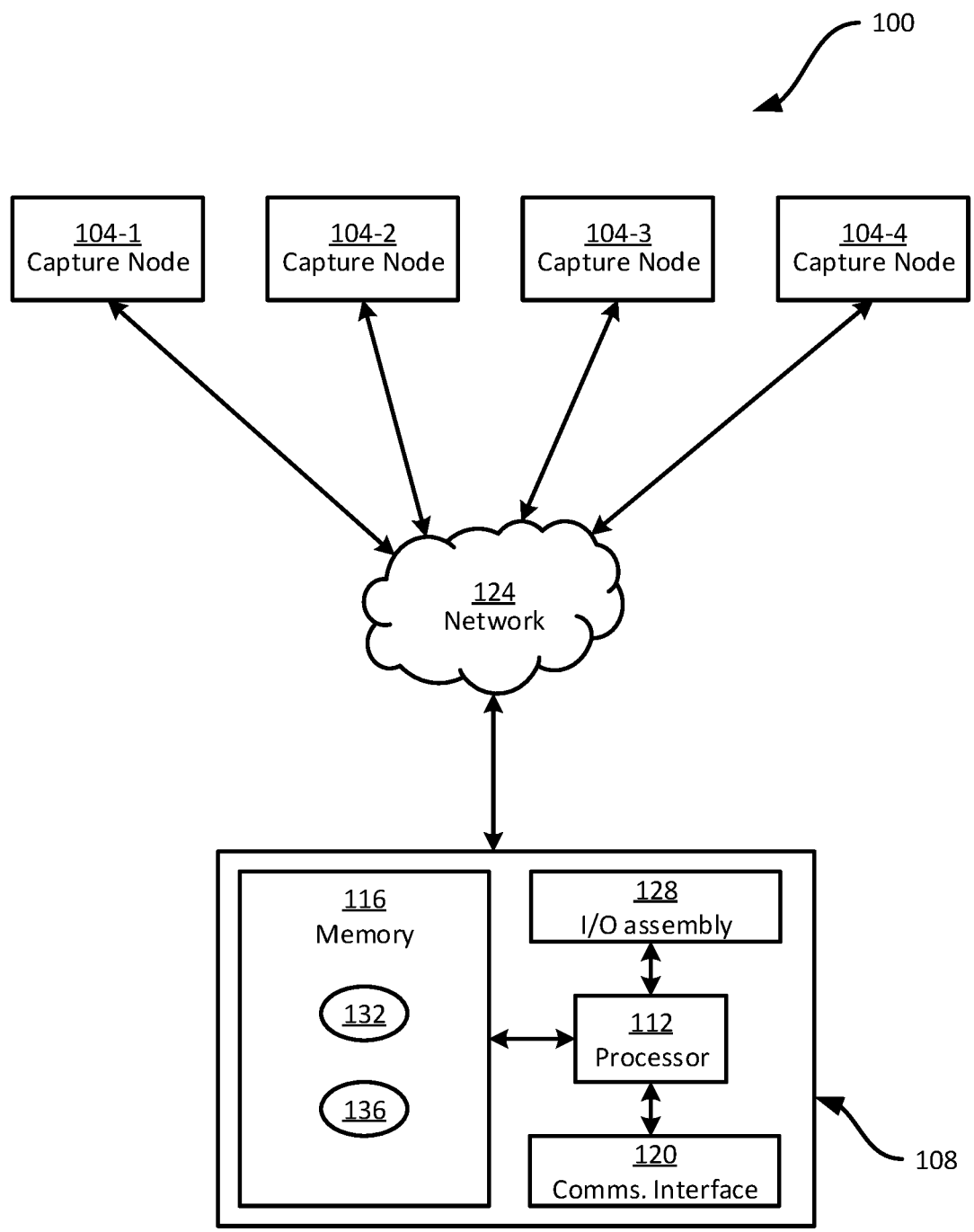
FIG. 1 is a block diagram of an example data capture system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a server, comprising: a memory storing calibration data; and a processor connected with the memory, the processor configured to: obtain a point cloud depicting a capture volume containing a transporter having a body and a holder carrying an object to be dimensioned; obtain a set of positions associated with the transporter; based on the set of positions and the calibration data: generate side cutting planes corresponding to sides of the body of the transporter; generate a front cutting plane corresponding to a forward surface of a mast of the holder; and discard points between the side cutting planes and the front cutting plane to obtain a first portion of the point cloud; based on the calibration data, select a second portion of the point cloud from the first portion, excluding a base of the holder; and dimension the object based on the second portion of the point cloud.

Additional examples disclosed herein are directed to a method comprising: storing calibration data; obtaining a point cloud depicting a capture volume containing a transporter having a body and a holder carrying an object to be dimensioned; obtaining a set of positions associated with the transporter; based on the set of positions and the calibration data: generating side cutting planes corresponding to sides of the body of the transporter; generate a front cutting plane corresponding to a forward surface of a mast of the holder; and discarding points between the side cutting planes and the front cutting plane to obtain a first portion of the point cloud excluding the body of the transporter and the mast of the holder; based on the calibration data, selecting a second portion of the point cloud from the first portion, excluding a base of the holder; and dimensioning the object based on the second portion of the point cloud.

FIG. 1 depicts a data capture system 100 for object dimensioning. The data capture system 100 is configured to capture image data depicting an object within a capture volume. The image data (e.g. a set of two-dimensional images captured substantially simultaneously) can be processed to generate a point cloud representing the object to be dimensioned. Dimensions for the object can then be determined based on the point cloud.

In particular, the system 100 includes a plurality of capture nodes 104. In the illustrated example, four capture nodes 104-1, 104-2, 104-3 and 104-4 are shown. In other examples, a greater or smaller number of capture nodes 104 can be provided. As will be discussed in greater detail below, each capture node 104 includes a set of cameras controllable to capture respective images of the above-mentioned capture volume. More specifically, the cameras of each capture node 104 capture images of a given region of the capture volume. Together, the regions of coverage of the capture nodes 104 encompass substantially the entire capture volume. From the images captured by the cameras of a given node 104, a computing device associated with that node 104 generates a point cloud (e.g. via the execution of a photogrammetry application or other suitable point cloud generation mechanism).

In the illustrated example, therefore, the capture nodes 104 produce four point clouds, each depicting a respective region of the capture volume containing the object. The regions, and therefore the point clouds generated at the capture nodes 104, generally overlap at the boundaries thereof.

The system 100 also includes a data capture server 108, also referred to simply as the server 108. The server 108 is connected to the computing devices of each of the capture nodes 104, and receives the above-mentioned point clouds from the capture nodes 104. The server 108 is configured to combine the point clouds from the capture nodes 104 to produce a single point cloud depicting at least a portion of the capture volume. The server 108 is further configured, as will be described in greater detail below, to select a portion of the combined point cloud that contains the object and excludes other structures, such as a forklift or other transporter carrying the object. Once the portion of the point cloud representing the object has been selected, the server 108 can then determine dimensions for the object.

Generating point clouds for regions of the capture volume at the individual capture nodes 104, and combining the node-specific point clouds at the server 108, enables the computationally demanding task of point cloud generation to be parallelized. Such parallelization may enable the system 100 to generate a complete point cloud and determine dimensions for the object in the capture volume more quickly than in a system in which point cloud generation is performed at a single device, based on the complete set of images from all cameras.

FIG. 1 also illustrates certain internal components of the server 108. The server 108 includes a central processing unit (CPU), also referred to as a processor 112, interconnected with a non-transitory computer readable storage medium, such as a memory 116. The memory 116 includes any suitable combination of volatile memory (e.g. Random Access Memory (RAM)) and non-volatile memory (e.g. read only memory (ROM), Electrically Erasable Programmable Read Only Memory (EEPROM), flash) memory. The processor 112 and the memory 116 each comprise one or more integrated circuits (ICs).

The server 108 also includes a communications interface 120, enabling the server 108 to exchange data with other computing devices, for example via a network 124. The communications interface 120 therefore includes any suitable hardware (e.g. transmitters, receivers, network interface controllers and the like) allowing the server 108 to communicate over the network 124.

The server 108 can also further include an input/output assembly 128, which can include a suitable combination of input devices (e.g. a keyboard, a mouse, a microphone, or the like) and output devices (e.g. a display, a speaker or the like). The components of the server 108 are interconnected by communication buses (not shown), and powered by a battery or other power source, over the above-mentioned communication buses or by distinct power buses (not shown).

The memory 116 of the server 108 stores a plurality of applications, each including a plurality of computer readable instructions executable by the processor 112. The execution of the above-mentioned instructions by the processor 112 causes the server 108 to implement certain functionality, as discussed herein. The applications are therefore said to be configured to perform that functionality in the discussion below. In the present example, the memory 116 of the server 108 stores a point cloud generator application 132, and a dimensioning application 136 (also referred to herein simply as the applications 132 and 136, respectively).

The server 108 is configured, via execution of the application 132 by the processor 112, to obtain point clouds from at least a subset of the capture nodes 104 (up to and including all of the capture nodes 104), and to generate a combined point cloud therefrom. Via execution of the application 136, the server 108 can be configured to detect an object within the combined point cloud and determine dimensions for the object.

The applications 132 and 136 can, in other examples, be implemented as a single application, or as more than two applications. In other examples, the processor 112, as configured by the execution of the applications 132 and 136, is implemented as one or more specifically-configured hardware elements, such as field-programmable gate arrays (FPGAs) and/or application-specific integrated circuits (ASICs). In further examples, the functionality implemented by the server 108 via the execution of an application, such as the application 136, can be implemented by a separate computing device, such as a dimensioning server accessible via the network 124, rather than by the server 108.

Figure 2:
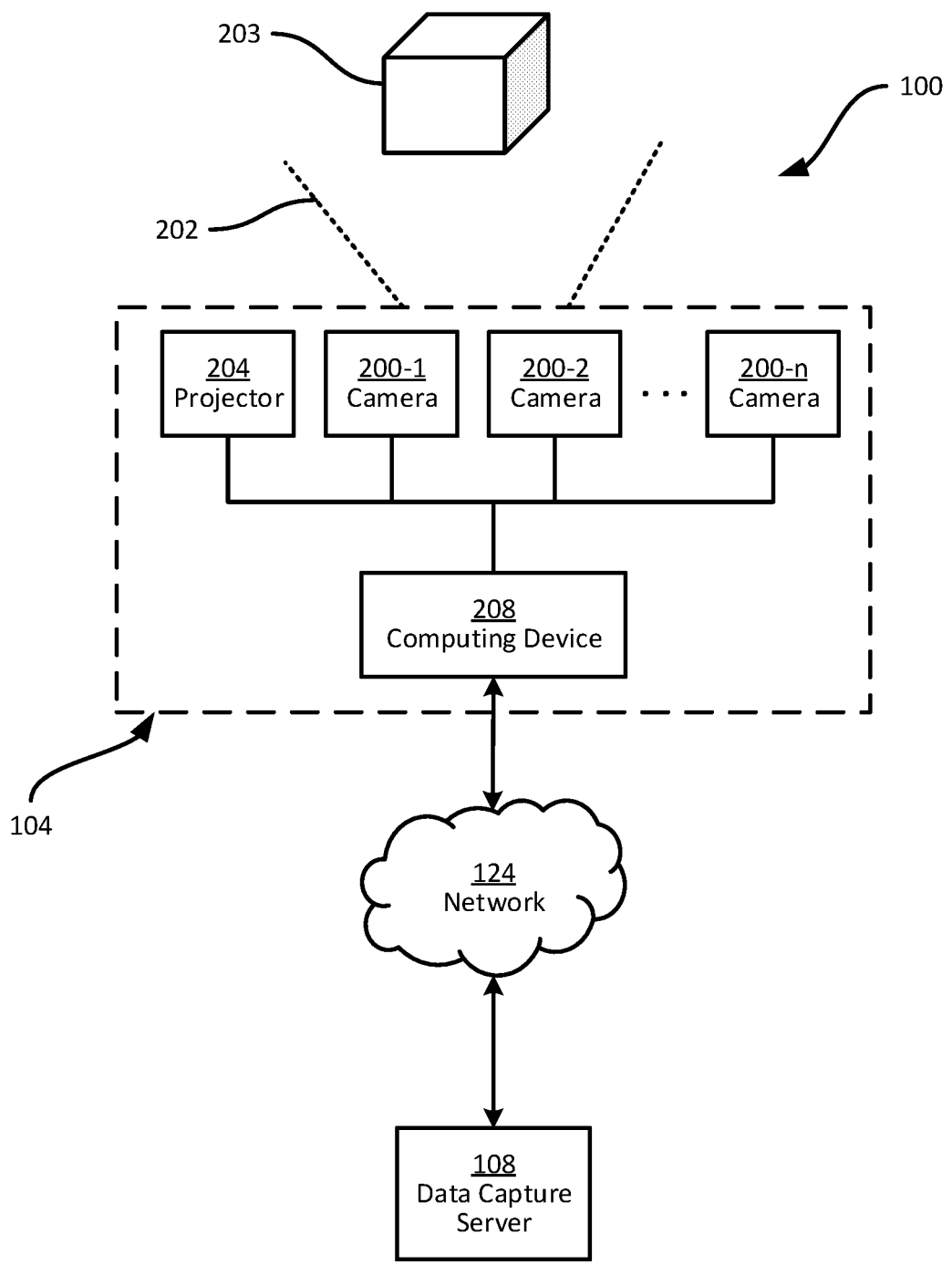
FIG. 2 is a block diagram illustrating additional components of the system of FIG. 1.

Turning to FIG. 2, example components of a capture node 104 are shown. Each of the capture nodes 104 shown in FIG. 1 can include the components illustrated in FIG. 2 and discussed below.

The capture node 104 includes a plurality of image sensors 200-1, 200-2, . . . 200-*n*. For example, each capture node 104 may include four image sensors 200. The image sensors 200 may also be referred to as cameras 200. Each camera 200 has a distinct field of view (FOV), as the cameras 200 are placed at distinct physical positions relative to one another. The FOVs of the cameras 200 of a given capture node 104 overlap (e.g. by 40%, although greater and smaller overlaps are also contemplated). FIG. 2 illustrates an FOV 202 for the capture node 104 as a whole. The FOV 202 encompasses a region of the capture volume for which the capture node 104 can generate a point cloud. The point cloud may depict at least a portion of an object 203 within the capture volume.

The capture node 104 also includes a projector 204. In other examples, multiple projectors 204 may be included in the capture node 104. In further examples, certain capture nodes 104 may include one or more projectors 204, while other capture nodes may omit the projector 204. The projector 204 is controllable to project a structured light pattern onto the capture volume, e.g. to illuminate the object 203 within the capture volume. The structured light pattern can be selected to be readily detectable in images captured by the cameras 200, to facilitate generation of the point cloud mentioned above.

The capture node 104 also includes a computing device 208 connected with the cameras 200 and the projector 204. The computing device 208 can control the cameras 200 to capture images of the capture volume within the FOV 202, while the projector 204 illuminates the capture volume. The computing device 208 also generates a point cloud from the images captured by the cameras 200. As will now be apparent, the point cloud represents a portion of the capture volume, and therefore may represent some, all or none of the object 203 (depending on the position of the object 203 within the capture volume).

Figure 3:
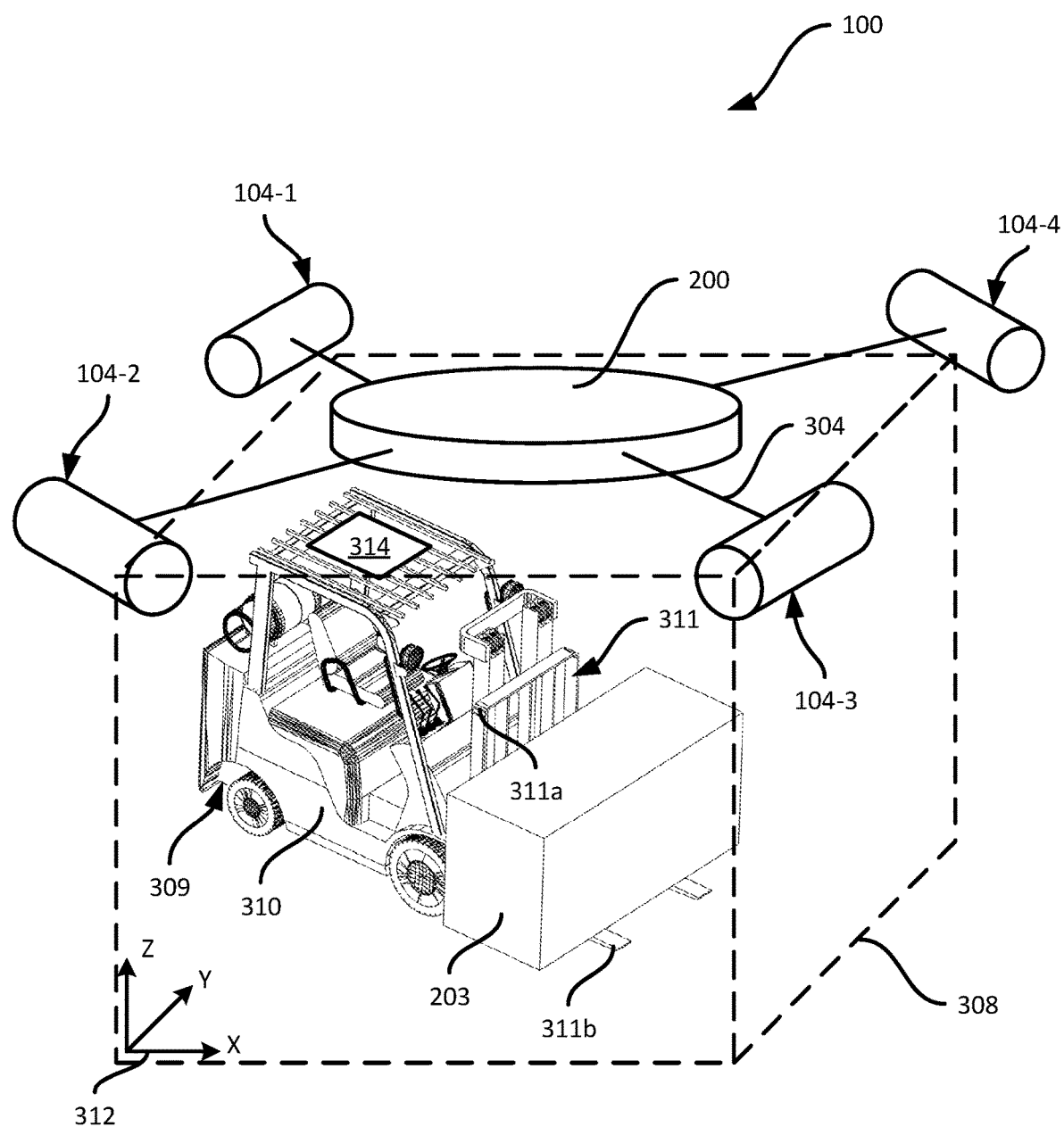
FIG. 3 is a diagram illustrating an example implementation of the data capture system of FIG. 1.

Turning to FIG. 3, certain components of the system 100 are shown in an example deployment. The example deployment shown in FIG. 3 includes the four capture nodes 104 mentioned above, e.g. with the cameras 200 and projector 204 of each node 104 contained within a substantially cylindrical housing. A wide variety of other structural arrangements may also be employed for each node 104.

The nodes 104 are supported, e.g. by a central support structure 300 connected with the nodes 104 via conduits 304. The nodes 104 can also be supported by support members extending from a ceiling (not shown) of the facility. The conduits 304, when used in the system 100, can carry communications lines and cooling fluid (e.g. conditioned air or the like). The central support structure 300 can therefore contain cooling or other conditioning equipment, and may also contain the server 108.

As noted earlier, the cameras 200 of the nodes 104 are positioned such that the field of view of each camera 200 encompasses at least a portion of a capture volume 308, such as a 10×10×10 foot volume. Further, the fields of view of adjacent cameras 200 within each node 104 overlap, e.g. by about 40%. Together, the cameras 200 thus provide substantially complete coverage of the capture volume 308 (e.g. each position in the capture volume 308 is within the field of view of at least two cameras 200).

The object 203 may be placed within the capture volume 308 to remain stationary during capture and dimensioning, or the object 203 may be transported through the capture volume 308 via any suitable locomotive mechanism. The system 100, in other words, may dimension the object 203 at rest or in motion. In the illustrated example, the locomotive mechanism is a transporter such as a forklift 309. The forklift 309 includes a body 310, e.g. including a cab, seat or the like for an operator, engine and other components. The forklift 309 also includes a holder 311 to support the object 203. In the present example, the holder 311 includes a mast 311a, which may include a guard or the like as shown in FIG. 3. The holder 311 also includes a base 311b, such as the pair of forks illustrated in FIG. 3. In general, the mast 311a establishes a rear support surface for the object 203, while the base 311b establishes a lower support surface for the object 203.

The system 100 is configured to detect when the object 203 has entered the capture volume 308, and in response to such detection, to control components thereof in order to configure the projectors 204 and cameras 200, capture images with the cameras 200, and generate point cloud data.

In particular, the computing device 208 of each node 104 is configured to generate a point cloud from the images captured by the cameras 200 of that node 104. The point cloud generated by a given node 104 thus depicts a portion of the capture volume 308 corresponding to the FOV 202 of that node 104. The point clouds generated by the nodes 104 may use a local frame of reference specific to each node 104, or may use a common frame of reference 312 established for the capture volume 308 when the system 100 is deployed. When the nodes 104 generate point clouds using the common frame of reference 312, the computing device 208 of each node 104 can store calibration data defining the physical position of the cameras 200 of that node 104 relative to the origin of the common frame of reference 312. When the nodes 104 employ local frames of reference, the server 108 can register the node-specific point clouds to the common frame of reference 312 using calibration data.

The nodes 104 are also configured to detect, in the images captured and employed for point cloud generation, a set of fiducial markers affixed to the forklift 309. The fiducial markers can include any of a variety of marker types, including IR-reflective markers, reflective tape, and the like. The markers are placed at predefined locations on the forklift 309, and upon detecting the markers in captured images, each node 104 is configured to provide the detected positions of each marker (e.g. in the frame of reference 312) to the server 108.

The markers can, in some examples, be encoded with distinct identifiers to distinguish each marker from the others. Further, the combination of distinct identifiers encoded by the markers may allow the server 108 to identify a model and corresponding specific calibration data for the forklift 309.

The nodes 104 can therefore each provide to the server 108 a point cloud and one or more marker positions and identifiers. As will be discussed below, the server 108 employs the marker positions and forklift-specific calibration data to select a portion of the combined point cloud that incudes the object 203 but excludes the forklift 309 (both the body 310 and the holder 311). Isolating the object 203 facilitates subsequent dimensioning of the object 203.

The forklift 309 can also include a reference surface 314 placed thereon and detectable by additional fiducial markers, a predefined color or surface pattern, or the like. As will be discussed below, in some examples the location of the reference surface 314 as detected by the nodes 104 may be reported to the server 108 and the server 108 may employ the reference surface 314 to assess the quality (e.g. noise level) of the combined point cloud.

Figure 4:
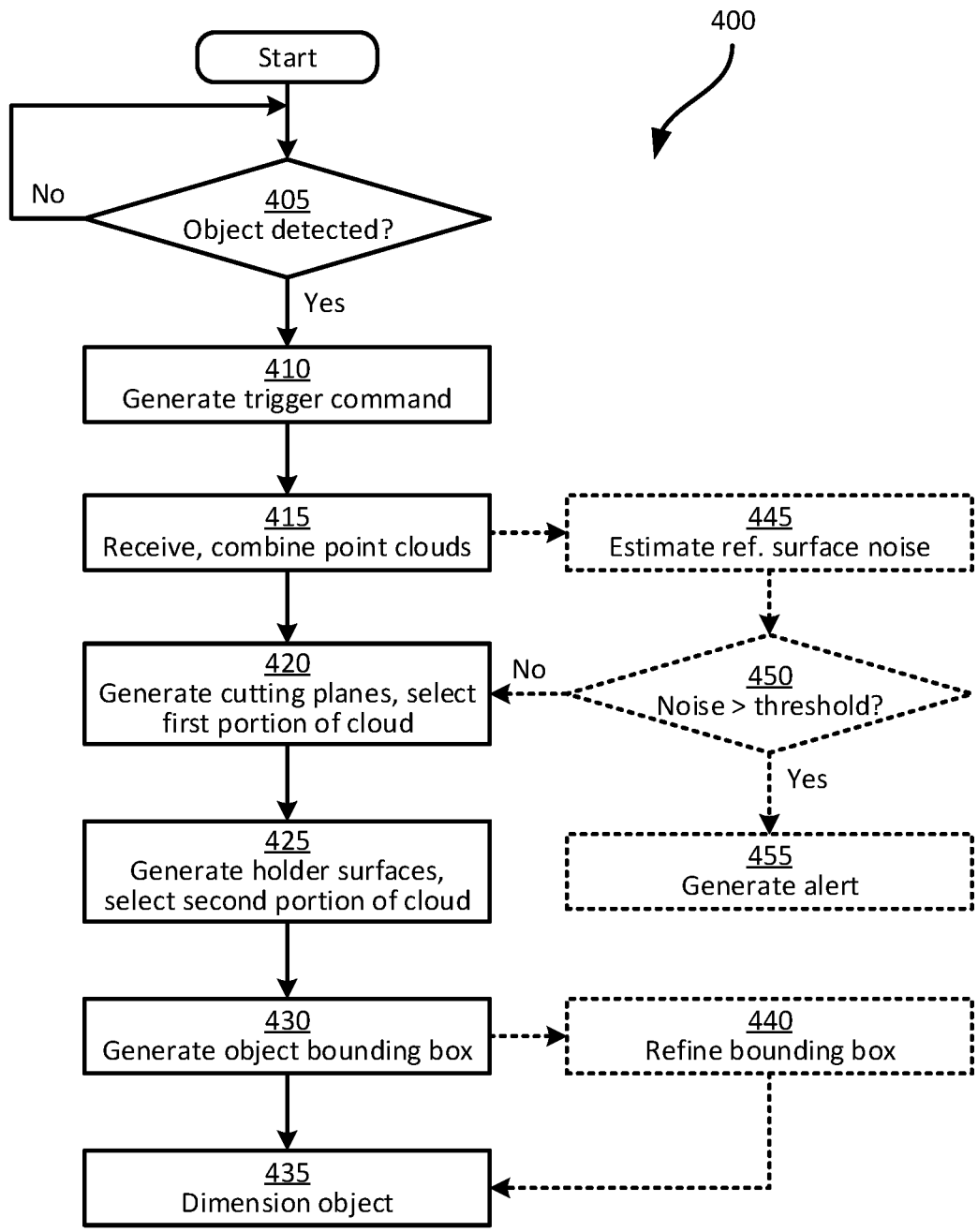
FIG. 4 is a flowchart of a data capture method for object dimensioning.

Turning to FIG. 4, a method 400 of data capture for object dimensioning is illustrated. The method 400 will be described in conjunction with its performance in the system 100, and in particular by the server 108. In general, performance of the method 400 enables the server 108 to obtain individual point clouds from the nodes 104, each representing a portion of the capture volume 308, and to generate a combined point cloud according to the common frame of reference 312. From the combined point cloud, the server 108 may then determine dimensions for the object 203.

At block 405, the server 108 is configured to determine whether an object (e.g. the object 203) is detected within the capture volume 308, or adjacent to the capture volume 308. Object detection at block 405 can be based on any of a variety of suitable trigger mechanisms. For example, a lidar sensor, IR sensor or the like disposed near the perimeter of the capture volume 308 may generate a detection signal when the object 203 enters the capture volume 308. In other examples, at least one of the nodes 104 can be configured to transmit a stream of images captured via at least one camera 200 to the server 108. The server 108 can process the images to detect objects in motion therein. When the determination at block 405 is affirmative, the server proceeds to block 410. When the determination at block 405 is negative, the server 108 can repeat the performance of block 405.

At block 410 the server 108 generates a trigger command to cause at least one of the nodes 104 to capture images and generate a point cloud therefrom. For example, the server 108 may select a subset of the nodes 104, or all of the nodes 104, and transmit a trigger command to each selected node 104. At each node 104 that receives the trigger command, the corresponding computing device 208 controls at least a subset of the cameras 200 to capture images substantially simultaneously, and generates a point cloud from the images via the execution of a suitable point cloud generation mechanism (e.g. a photogrammetry application or the like).

Having generated the trigger command and sent the trigger command to the nodes 104 to initiate point cloud generation at the nodes 104, the server 108 proceeds to block 415. At block 415, the server 108 is configured to receive point clouds from each of the nodes 104, as well as the positions and identifiers of any fiducial markers detected by the nodes 104, in the frame of reference 312. The server 108 is configured to generate a single combined point cloud from the point clouds received from the nodes 104. In some examples, generation of the combined point cloud includes registering each received node-specific point cloud to the frame of reference 312. In other examples, the combined point cloud can be generated by selecting portions of each node-specific point cloud and excluding other portions; such functionality is outside the scope of the present discussion, however.

Figure 5:
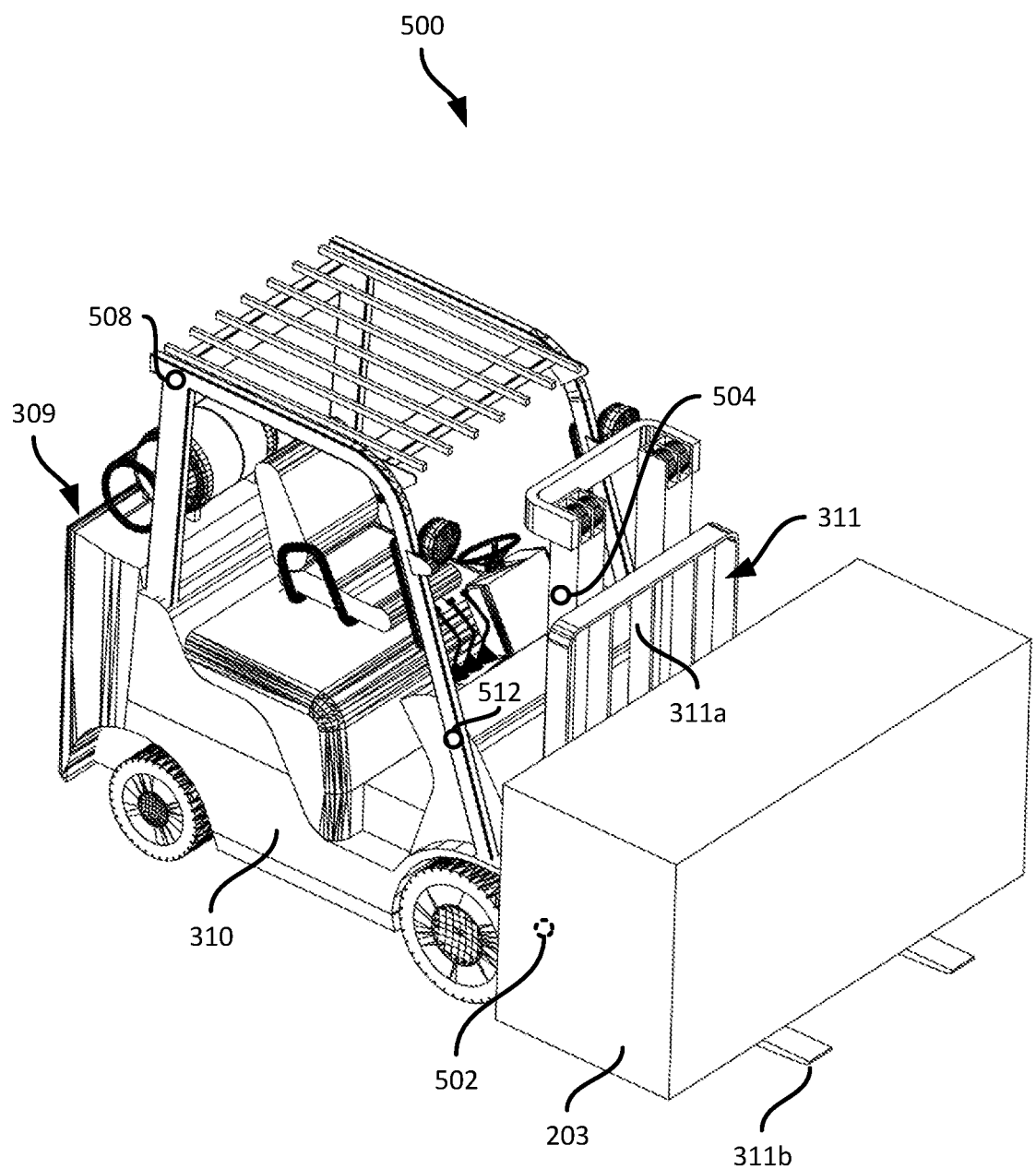
FIG. 5 is a diagram illustrating an example point cloud generated by the system of FIG. 1.

FIG. 5 illustrates an example point cloud 500 generated at block 415, depicting the forklift 309 and the object 203. Also indicated in FIG. 5 are fiducial markers 502, 504, 508 and 512. As noted earlier, the positions of the markers 502-512 are reported to the server 108 by the nodes 104, which are configured to detect the markers in images captured via the cameras 200. Each marker 502-512 is defined, as received at the server 108, by a position (as shown in FIG. 5) and an identifier (e.g. the reference numerals shown in FIG. 5).

At block 420, the server 108 is configured to obtain a first portion of the combined point cloud excluding the body 310 of the transporter and the mast 311a of the holder 311. Specifically, the server 108 is configured to generate side cutting planes corresponding to sides of the body 310 of the transporter, and a front cutting plane corresponding to a forward surface of the mast 311a of the holder 311. The space between the side cutting planes and the front cutting plane thus represent the body 310 of the transporter and the mast 311a of the holder 311, and hence the server 108 discards points between the side cutting planes and the front cutting plane to obtain the first portion of the combined point cloud.

Figure 6:
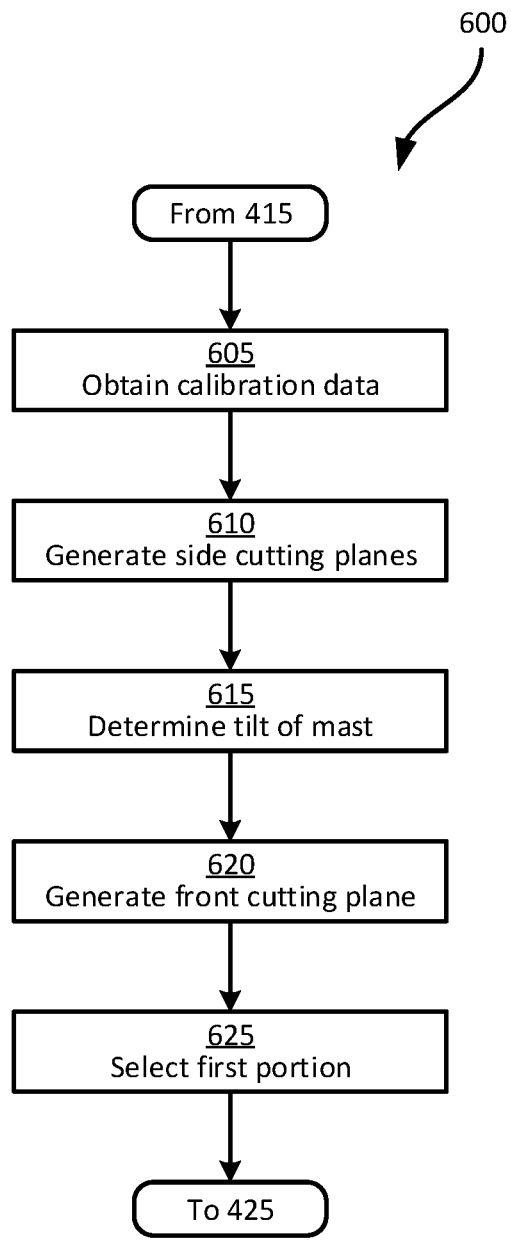
FIG. 6 is a flowchart of a generating the cutting planes and selecting a first portion of the point cloud at block 420 of the method of FIG. 4.

For example, referring to FIG. 6, a method 600 of obtaining the first portion of the point cloud is illustrated.

At block 605, the server 108 obtains calibration data for the forklift 309. In some examples, the server 108 may first identify the forklift 309, for example by the model number or other identifier of the forklift 309. Specifically, the server 108 may extract, from the markers 502-512, distinct identifiers of each marker. The combination of distinct identifiers of the markers 502-512 may, in turn, identify the forklift 309.

The server 108 stores forklift calibration data, e.g. in the memory 116. In response to identifying the forklift 309, the server 108 may retrieve the forklift calibration data from the memory 116 according to the model number or other identifier of the forklift 309. The calibration data defines the positions of various structural features of the forklift 309 relative to the positions of the markers 502-512. For example, the calibration data can define positions for the markers 502-512 as well as positions of other structural features of the forklift 309 in a local frame of reference. Based on the positions of the markers 502-512 in the frame of reference 312, the positions of the other structural features of the forklift 309 in the frame of reference 312 can be determined.

At block 610, the server 108 generates side cutting planes corresponding to sides of the body 310 of the transporter.

Figure 7A:
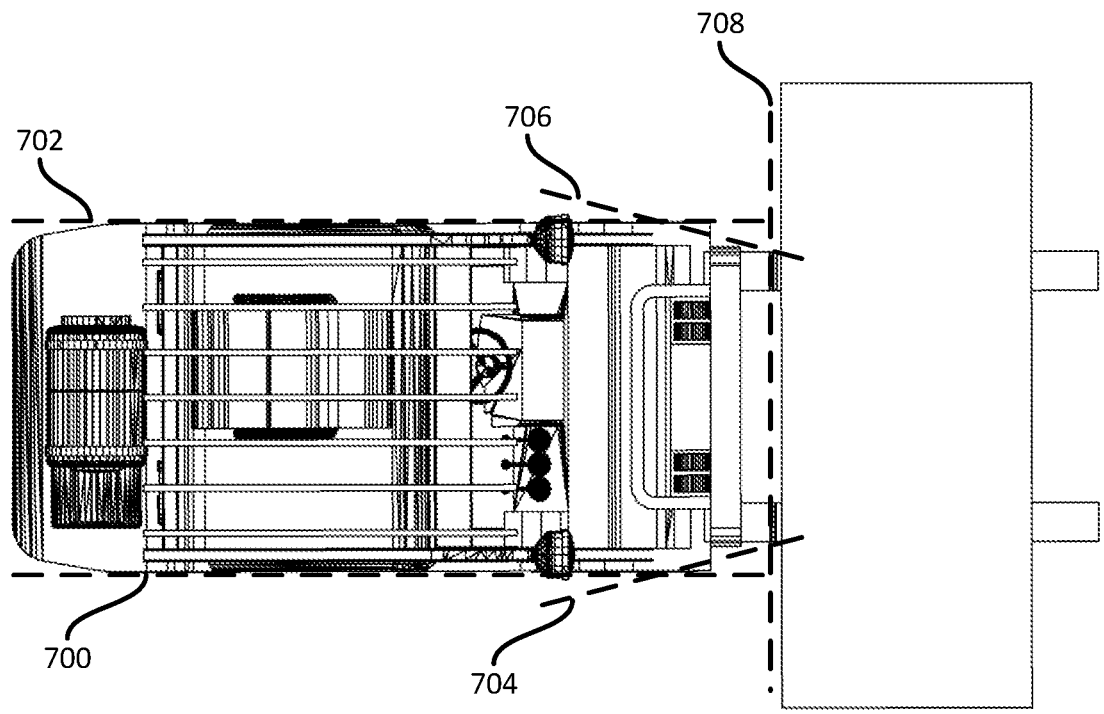
FIGS. 7A and 7B are diagrams illustrating the generation of a cutting plane at block 420 of the method of FIG. 4.
Figure 7B:
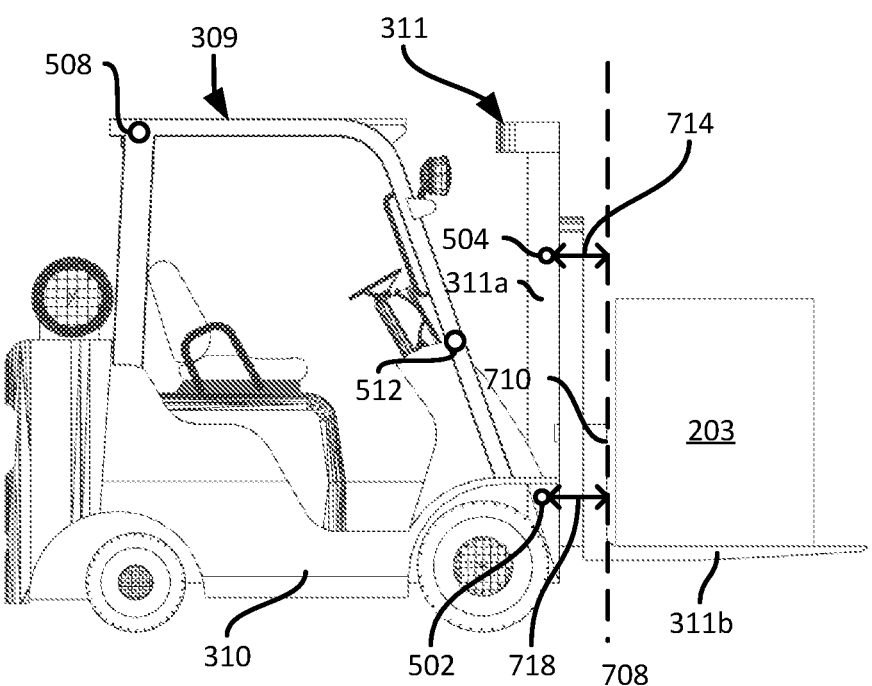

For example, referring to FIGS. 7A and 7B, the server 108 may first generate first and second side cutting planes 700 and 702 corresponding to side surfaces of the body 310 of the transporter. The forklift calibration data may define a position of the side surfaces of the body 310 of the transporter relative to the markers 502-512. For example, the forklift calibration data may define the side cutting plane 700 as the plane containing the markers 508 and 512 and which is perpendicular to the ground plane. In other examples, the side cutting plane 700 may be oriented at a predefined angle relative to the ground plane, as defined in the forklift calibration data. In further examples, the forklift calibration data may define an offset between the side cutting plane 700 and the markers 508 and 512, for example, if portions of the body 310 of the transporter extend past the positions of the markers 508 and 512.

In the present example, the forklift 309 includes markers on one side of the body 310. Accordingly, after having generated the first cutting plane 700, the server 108 may generate the second cutting plane 702 based on the forklift calibration data. Specifically, the forklift calibration data may define a width of the body 310, and an angle of the second cutting plane 702 relative to the first cutting plane 700. By placing the markers 502-512 on only one side of the body 310, the computational burden of identifying the markers 502-512 in the images is reduced. Rather, the server 108 need only compute the position of the second cutting plane 702 relative to the first cutting plane 700.

In other examples, additional markers, including markers on both sides of the body 310 may be utilized. For example, in other applications where multiple nodes 104 are used to capture markers 502-512 of FIG. 5 and opposing markers reflective of the markers 502-512 on the opposite side of the forklift 309, the body 310 may be removed by establishing the plane 708 by capturing at least three markers located on the mast (e.g., the markers 502 and 504 and the opposing markers reflective of the markers 502 and 504). Both the cutting plane 708 and the tilt may be determined substantially simultaneously.

Having generated the first and second side cutting planes 700 and 702, the server 108 may generate third and fourth side cutting planes 704 and 706 corresponding to forward portions between the mast 311a of the holder 311 and the sides of the body 310. Often, the mast 311a may be narrower than the body 310, and hence the forward portions may be angled outward from the mast 311a to the body 310, as can be seen in FIG. 7A. The forklift calibration data may define the side cutting plane 704 as the plane containing the markers 504 and 512 and which is perpendicular to the ground plane. In some examples, the forklift calibration data may define an angle or an offset of the side cutting plane 704. As with the cutting planes 700 and 702, after having generated the third cutting plane 704, the server 108 may generate the fourth cutting plane 706 based on forklift calibration data, including a width of the mast 311a and an angle of the fourth cutting plane 706 relative to the third cutting plane 704.

Returning to FIG. 6, at block 615, the server 108 determines a tilt of the mast 311a based on the positions of the markers 502-512. For example, the marker 504 may be located on the mast 311a, while the marker 502 is located to represent a pivot point of the mast 311a. Accordingly, by computing the relative angle between the line defined by the markers 504, 500, and, for example, the Z axis, the server 108 may determine the tilt of the mast 311a.

At block 620, the server 108 generates a front cutting plane corresponding to a forward surface of the mast 311a based on the positions of the markers 502-512 and the tilt of the mast determined at block 615. For example, referring to FIG. 7B, the forklift calibration data can define an offset 714 between a plane containing a forward surface 710 of the mast 311a and the marker 504, as well as an offset 718 between the above-mentioned plane and the marker 502. Based on the offsets 714 and 718, the positions of the markers 502 and 504 in the point cloud, and the tilt determined at block 615, a front cutting plane 708 is defined in the frame of reference, which may contain the forward surface 710.

Other methods of generating the cutting planes 700-708 are also contemplated. For example, the forklift calibration data can define an orientation and distance from planes traversing the length of the mast 311a or the body 310 to the cutting planes 700-708. In such implementations, the server 108 can generate the traversing planes based on the positions of the markers 502-512.

Figure 8:
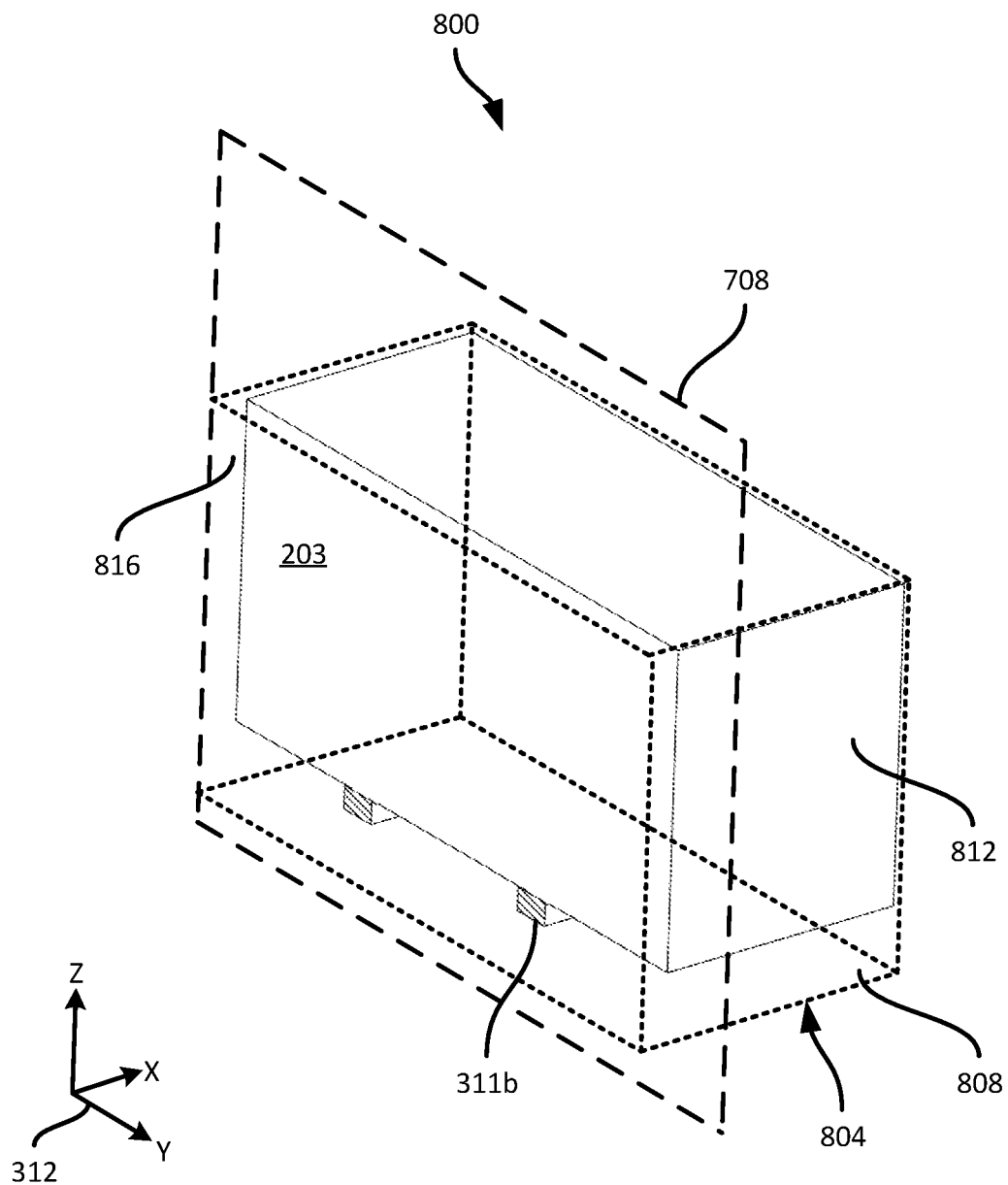
FIG. 8 is a diagram illustrating an example performance of block 420 of the method of FIG. 4.

Returning again to FIG. 6, at block 625, having generated the side cutting planes 700-706 and the front cutting plane 708, the server 108 is configured to select a first portion of the point cloud that excludes the points between the cutting planes 700-708. In other words, the portion of the point cloud containing the markers 502-512 can be discarded, or retained but excluded from subsequent processing. As a result of the performance of block 625, the server 108 selects a first portion 800, as shown in FIG. 8, that still represents the object 203 and at least a portion of the base 311b of the holder 311 but omits the remainder of the forklift 309. More particularly, the excluded portion is generally in the shape, including the width, of the forklift 309, and hence the approach shown in FIG. 6 avoids excluding portions of the object which may extend past the forward surface 710 of the mast 311a adjacent to the body 310 of the forklift 309.

Returning to FIG. 4, at block 425 the server 108 is configured to select a second portion of the point cloud 500 from the first portion 800. That is, the second portion is a subset of the first portion 800. Specifically, the second portion is selected to include the object 203, but exclude the remainder of the holder 311 (i.e. the base 311b still represented in the first portion 800). To select the second portion, the server 108 identifies a lower surface of the base 311b. For example, referring again to FIG. 8, the server 108 can generate a bounding box 804, such as an axis-aligned bounding box (AABB) with faces parallel to respective axes of the frame of reference 312. In other examples, the bounding box 804 may be aligned according to the tilt of the mast 311a.

The bounding box has a lower surface 808 with a predefined angle relative to the forward cutting plane 708, the angle being defined in the forklift calibration data as the angle between the mast 311a and the base 311b. The lower surface 808 is positioned at the height (i.e. position along the Z axis) of the lowest point in the portion 800 (i.e. the point with the lowest Z coordinate).

The bounding box 804 also includes side surfaces 812 and 816, e.g. parallel to the XZ plane of the frame of reference 312, positioned along the Y axis at the maximum and minimum Y values present in the portion 800, respectively. Similarly, upper and forward surfaces of the bounding box 804 are defined by the extents of the points in the portion 800. A rear surface of the bounding box 804 is coplanar with the cutting plane 708.

Figure 9:
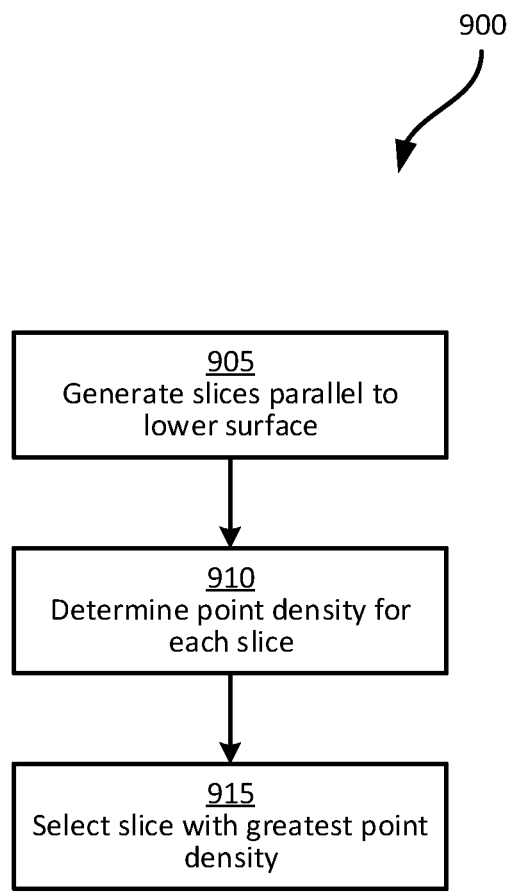
FIG. 9 is a flowchart of refining a surface of a bounding box at block 425 of the method of FIG. 4.

Having identified the lower surface 808 of the bounding box 804, the server 108 can proceed to identify a lower surface of the base 311b. In particular, based on the typical angle at which the nodes 104 are positioned to capture images, the combined point cloud may include noise, particularly near the base 311b. Accordingly, the server 108 may refine the lower surface of the bounding box 804 to identify the lower surface of the base 311b. For example, FIG. 9 depicts a method 900 for refining the lower surface.

Figure 10:
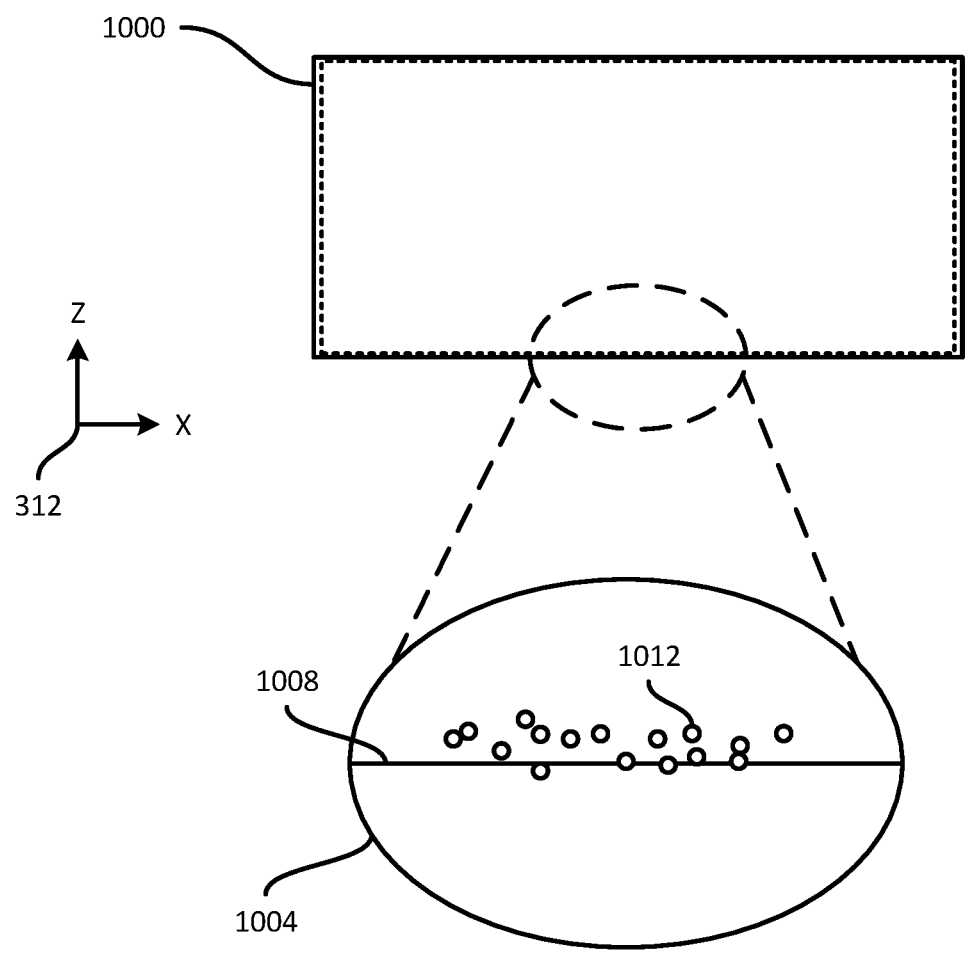
FIGS. 10-11 are diagrams illustrating an example performance of the method of FIG. 9.
Figure 11:
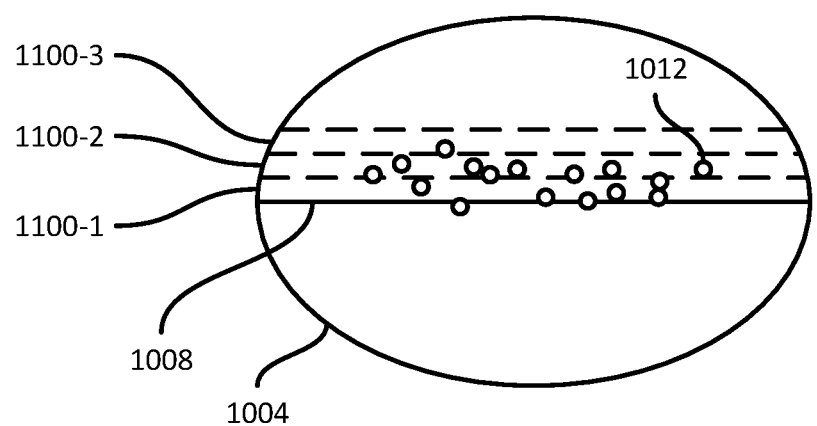
Figure 11:
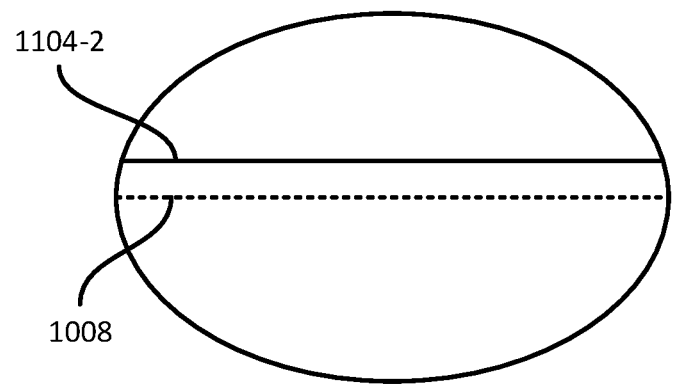

At block 905, the server 108 generates a plurality of slices, or regions, parallel to the lower surface 808. For example, FIG. 10 illustrates a bounding box 1000 (in solid lines) containing the points (in dashed lines) defining the portion 800. As shown in the detail view 1004, a boundary 1008 of the bounding box 1000 is generated based on a plurality of points 1012. To refine the boundary 1008, turning to FIG. 11, the server 108 is configured to generate a plurality of slices, or regions, parallel to the boundary 1008 and at predefined depths into the object 203 starting from the boundary 1008. Three example slices 1100-1, 1100-2 and 1100-3 are shown in FIG. 11, although smaller and greater numbers of slices may be employed in other examples.

At block 910, for each slice 1100, the server 108 is configured to determine a point density or a point count, indicating how densely populated with points 1012 the relevant slice 1100 is. As illustrated in FIG. 11, the slice 1100-3 contains only a single point, while the slices 1100-2 and 1100-3 contain, respectively, eight and six points.

At block 915, the server 108 is configured to select the slice 1100 with the greatest point density (i.e. the slice 1100-2 in the illustrated example), and update the boundary 1008 to match the position of that slice 1100. For example, as shown in the lower portion of FIG. 11, the boundary 1008 may be replaced with an updated boundary 1104-2, whose position is the middle of the slice 1100-2. More particularly, the server 108 may select the slice 1100-2 as the lower surface of the base 311b.

In some examples, the server 108 may include predefined rules to select a slice if the point densities of multiple slices are within a threshold percentage of one another. For example, if two slices having peak point densities are spatially close together (e.g., adjacent to one another, or within a predefined number of slices of one another), the server 108 may select the lower slice (i.e., the slice having the lower Z value). If the two slices having peak point densities are spatially far apart (e.g., more than a predefined number of slices away from each other), the server 108 may select the higher slice (i.e., the slice having the higher Z value). In further examples, other slice selection rules may be defined.

Figure 12:
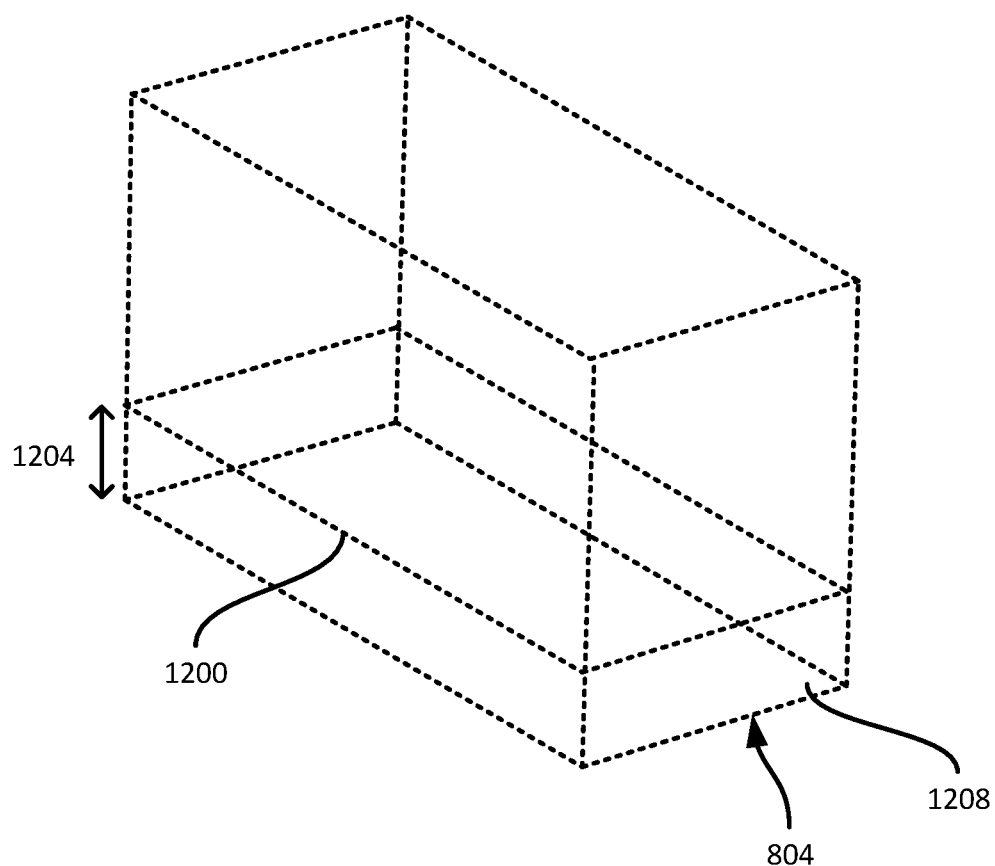
FIG. 12 is a diagram illustrating an example performance of block 425 of the method of FIG. 4.

Returning to FIG. 4, at block 425, having identified a lower surface of the base 311b, the server 108 can apply an offset corresponding to a height of the base 311b to the lower surface, to generate a further cutting plane. Referring to FIG. 12, a cutting plane 1200 is illustrated at an offset 1204 corresponding to the height of the base 311b, as indicated in the forklift calibration data. To select the second portion of the point cloud from the first portion 800, the server 108 can discard any points below the cutting plane 1200. Alternatively, the server 108 can discard any points between the cutting plane 1200 and the lower surface 808 of the bounding box 804.

Figure 13:
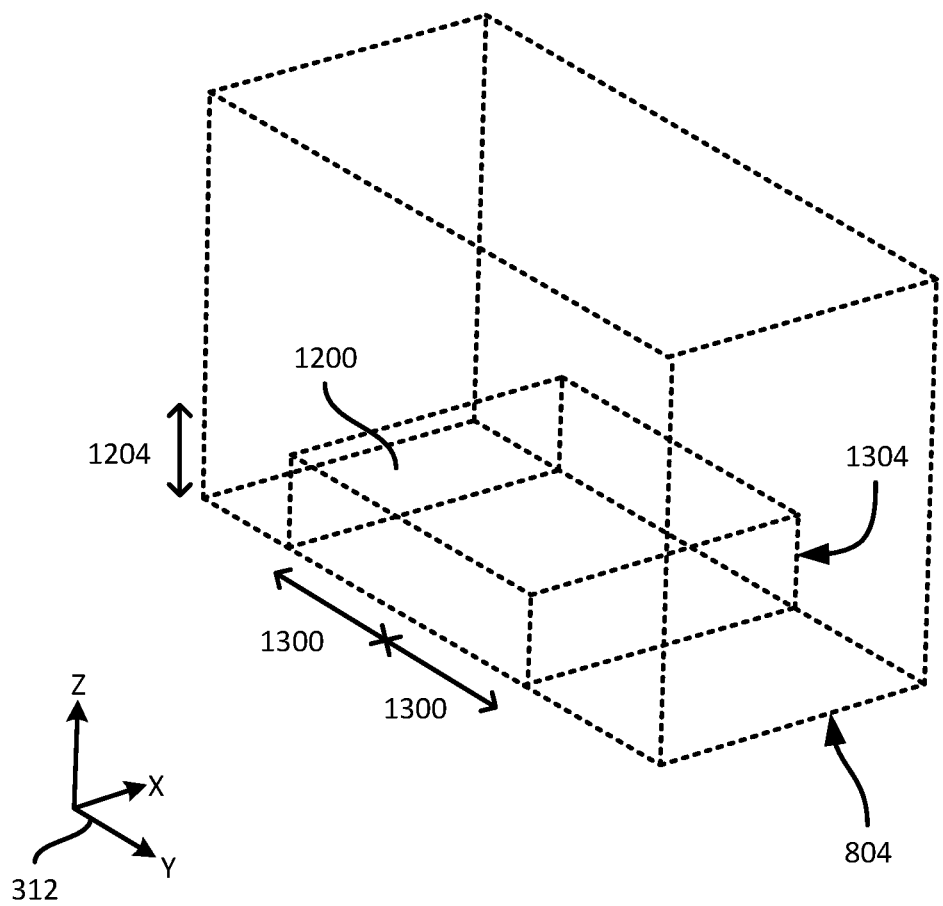
FIG. 13 is a diagram illustrating another example performance of block 425 of the method of FIG. 4.

In further examples, the server 108 can generate a cutting box by defining the cutting plane 1200 as noted above, as well as side cutting surfaces. Referring to FIG. 13, in addition to the cutting plane 1200, which forms the upper surface of a cutting box, the server 108 can determine a base center point in the bounding box 804 corresponding to a center line of the body 310 of the forklift 309 (e.g., by using the calibration data to extend a center line of the forklift 309 into the bounding box 804), and apply opposing offsets 1300 corresponding to one half of the distance between the forks of the base 311b to the base center point. The distance between the forks can be specified in the forklift calibration data. Based on the offsets 1300, the server 108 can define side surfaces for a cutting box 1304 as shown in FIG. 13. The server 108 can then discard any points from the portion 800 that lie within the cutting box. The approach shown in FIG. 13 may be desirable to avoid excluding portions of an object that hang over the sides of the forks.

Returning to FIG. 4, at block 430 the server 108 is then configured to generate an object bounding box. As will be apparent from the discussion above, the second portion of the point cloud excludes substantially all of the capture volume except for the object 203 itself. The server 108 can therefore generate a bounding box corresponding to the outer boundaries object 203 via any suitable plane fitting operations or other bounding box generation mechanisms.

At block 435, the server 108 is configured to determine dimensions of the object 203, such as a width, height and/or length of the object 203, a volume of the object, or the like, based on the above-mentioned bounding box.

In some examples, the server 108 can be configured to refine the bounding box generated at block 430 prior to dimensioning the object 203. When such a refinement is implemented, as shown in dashed lines in FIG. 4, the server 108 proceeds from block 430 to block 440 prior to dimensioning at block 435. In general, refinement of the bounding box at block 440 may include repeating the method 900 for at least one of the surfaces of the bounding box, up to and including all surfaces of the bounding box. That is, refinement of the bounding box includes evaluating point density of the second portion of the point cloud at various depths relative to the surfaces of the bounding box, and determining whether to adjust any of those surfaces. The point cloud may include a degree of noise in the points defining surfaces of the object 203, which may result in the surfaces of the bounding box being larger than the object 203 itself. Refinement of the bounding box at block 440 may enable the server 108 to increase the accuracy of the bounding box.

The use of slices to assess point densities for the surfaces of a bounding box can also be employed to assess the quality of the original point cloud in some examples. Returning to FIG. 4, in some examples the server 108 can proceed from block 415 to block 445 rather than directly to block 420. At block 445, the server 108 is configured to estimate a degree of noise for a reference surface in the point cloud, such as the reference surface 314 shown in FIG. 3. Because the reference surface 314 is on the forklift 309, the position of the reference surface can be determined from the positions of the markers 502-512 mentioned earlier, according to the forklift calibration data.

Figure 14:
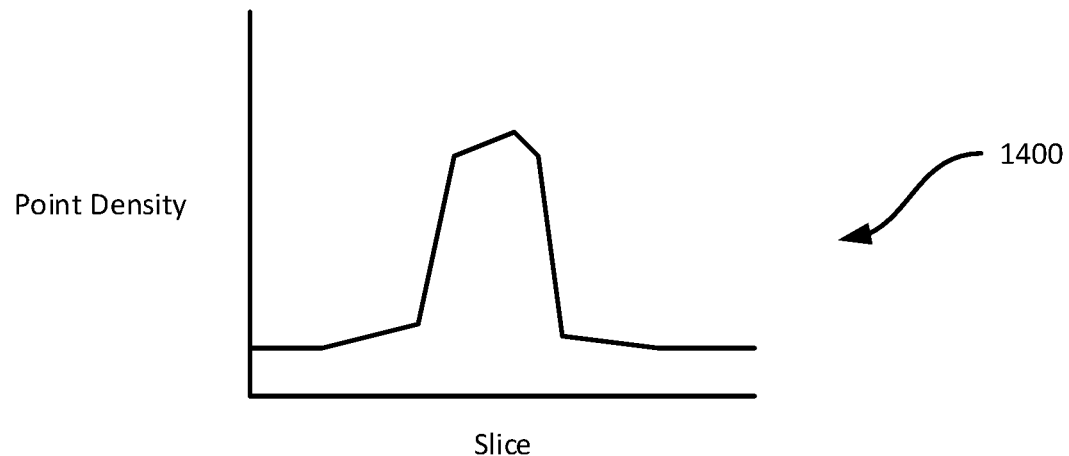
FIG. 14 is a diagram illustrating point density gradients employed in an example performance of block 450 of the method of FIG. 4.
Figure 14:
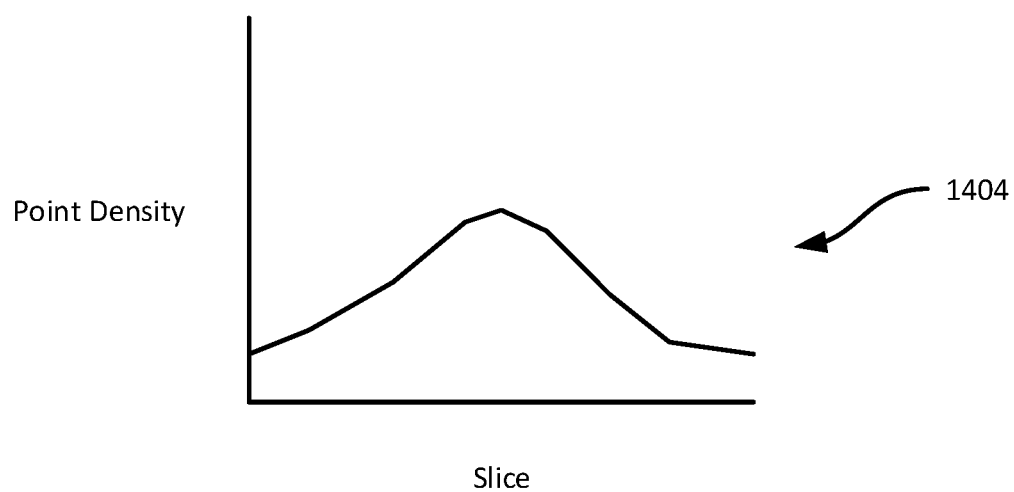

To estimate noise for the reference surface 314, the server 108 can select a portion of the point cloud containing only the reference surface 314 and perform the refinement procedure discussed above to determine point densities for each of a set of slices encompassing the points that define the reference surface 314. Because the reference surface 314 is a planar surface, a low level of noise is expected to result in point densities in a sequence of slices that display a peak such as that shown in FIG. 14 in the graph 1400. Point densities change that more gradually, as shown in the graph 1404 in FIG. 14, may indicate excessive noise in the point cloud. The server 108 may therefore be configured to determine a gradient between the point density measurements for each slice, with greater gradients indicating lower degrees of noise. For example, an average of the above gradients can be used as an indicator of a level of noise in the point cloud.

At block 450, the server 108 determines whether a level of noise determined at block 445 exceeds a threshold. For example, when the average gradient determined at block 445 exceeds a threshold, the determination at block 450 is affirmative, and the server 108 can proceed to block 455 rather than to block 420. At block 455, the server 108 can generate an alert (e.g. to another computing device and/or via a display, speaker or the like of the server 108) indicating that point cloud quality is not suitable for dimensioning of the object 203. In other examples, the server 108 may then perform a noise reduction operation. When the determination at block 450 is negative, the process discussed above continues at block 420.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A server, comprising:
a memory storing calibration data;
a processor connected with the memory, the processor configured to:
  obtain a point cloud depicting a capture volume containing a transporter having a body and a holder carrying an object to be dimensioned;
  obtain a set of positions associated with the transporter;
  based on the set of positions and the calibration data:
    generate side cutting planes corresponding to sides of the body of the transporter;
    generate a front cutting plane corresponding to a forward surface of a mast of the holder; and
    discard points between the side cutting planes and the front cutting plane to obtain a first portion of the point cloud;
  based on the calibration data, select a second portion of the point cloud from the first portion, excluding a base of the holder; and
  dimension the object based on the second portion of the point cloud; and
a communications interface;
  wherein the processor is further configured, in order to obtain the point cloud, to receive initial point clouds from a plurality of capture nodes via the communications interface, and combine the initial point clouds to generate the point cloud, and
  wherein the processor is configured, in order to select the second portion, to:
  generate a bounding box containing the object and the base, based on the first portion;
  identify a lower surface of the base based on the bounding box;
  generate an upper surface of the base according to the calibration data; and
  discard points between the lower surface and the upper surface.

2. The server of claim 1, wherein the processor is configured, in order to generate the front cutting plane, to:
  determine a tilt of the mast based on the set of positions and the calibration data; and
  generate the front cutting plane corresponding to the forward surface of the mast according to the tilt of the mast.

3. The server of claim 1, wherein the processor is configured, in order to generate the side cutting planes, to:
  generate a first of the side cutting planes according to the set of positions; and
  generate a second of the side cutting planes based on the first side cutting plane and the calibration data.

4. The server of claim 1, wherein the processor is configured, in order to generate the side cutting planes, to:
  generate first and second side cutting planes corresponding to the sides of the body of the transporter; and
  generate third and fourth side cutting planes corresponding to forward angled portions between the mast of the holder and the sides of the body of the transporter.

5. The server of claim 1, wherein the processor is configured, to identify the lower surface of the bounding box, to:
  determine point densities for each of a plurality of slices adjacent to a lower surface of the bounding box; and
  select the lower surface of the base corresponding to the one of the slices with the greatest point density.

6. The server of claim 1, wherein the processor is further configured to:
  identify a base center point in the bounding box, the base center point corresponding to a center line of the body of the transporter;
  generate side surfaces corresponding to sides of the base according to the base center point and the calibration data; and
  discard points between the lower surface, the upper surface, and the side surfaces.

7. The server of claim 1, wherein the processor is configured to identify the lower surface of the base with a predefined angle relative to the front cutting plane.

8. The server of claim 1, wherein the processor is further configured, in order to dimension the object, to:
  generate a bounding box corresponding to the object from the second portion of the point cloud;
  determine point densities for each of a plurality of slices adjacent to a surface of the bounding box;
  select an updated bounding box surface corresponding to the one of the slices with the greatest point density; and
  the determination of point densities and selection of an updated bounding box surface for each remaining surface of the bounding box.

9. A method, comprising:
storing calibration data;
obtaining a point cloud depicting a capture volume containing a transporter having a body and a holder carrying an object to be dimensioned;
obtaining a set of positions associated with the transporter;
based on the set of positions and the calibration data:
  generating side cutting planes corresponding to sides of the body of the transporter;
  generate a front cutting plane corresponding to a forward surface of a mast of the holder; and
  discarding points between the side cutting planes and the front cutting plane to obtain a first portion of the point cloud excluding the body of the transporter and the mast of the holder;

based on the calibration data, selecting a second portion of the point cloud from the first portion, excluding a base of the holder; and
dimensioning the object based on the second portion of the point cloud,
wherein obtaining the point cloud includes receiving initial point clouds from a plurality of capture nodes via a communications interface, and combining the initial point clouds to generate the point cloud, and
wherein selecting the second portion includes:
generating a bounding box containing the object and the base, based on the first portion;
identifying a lower surface of the base based on the bounding box;
generating an upper surface of the base according to the calibration data; and
discarding points between the lower surface and the upper surface.

10. The method of claim 9, wherein generating the front cutting plane comprises:
determining a tilt of the mast based on the set of positions and the calibration data; and
generating the front cutting plane corresponding to the forward surface of the mast according to the tilt of the mast.

11. The method of claim 9, wherein generating the side cutting planes comprises:
generating a first of the side cutting planes according to the set of positions; and
generating a second of the side cutting planes based on the first side cutting plane and the calibration data.

12. The method of claim 9, wherein generating the side cutting planes comprises:
generating first and second side cutting planes corresponding to the sides of the body of the transporter; and
generating third and fourth side cutting planes corresponding to forward angled portions between the mast of the holder and the sides of the body of the transporter.

13. The method of claim 9, wherein to identify the lower surface of the base based on the bounding box comprises:
determine point densities for each of a plurality of slices adjacent to a lower surface of the bounding box; and
select the lower surface of the base corresponding to the one of the slices with the greatest point density.

14. The method of claim 9, further comprising:
identifying a base center point in the bounding box, the base center point corresponding to a center line of the body of the transporter;
generating side surfaces corresponding to sides of the base according to the base center point and the calibration data; and
discarding points between the lower surface, the upper surface, and the side surfaces.

15. The method of claim 9, further comprising generating the lower surface with a predefined angle relative to the cutting plane.

16. The method of claim 9, wherein dimensioning the object includes:
generating a bounding box corresponding to the object from the second portion of the point cloud;
determining point densities for each of a plurality of slices adjacent to a surface of the bounding box; and
selecting an updated bounding box surface corresponding to the one of the slices with the greatest point density.

* * * * *